OR 3,980,395

United States Patent
Giallorenzi et al.

[11] 3,980,395
[45] Sept. 14, 1976

[54] LIQUID CRYSTAL SWITCH FOR OPTICAL WAVEGUIDE

[75] Inventors: Thomas G. Giallorenzi, Alexandria; Joel M. Schnur, Springfield, both of Va.

[73] Assignee: The United States of America as represented by the Secretary of the Navy, Washington, D.C.

[22] Filed: Dec. 2, 1974

[21] Appl. No.: 528,825

Related U.S. Application Data

[63] Continuation-in-part of Ser. No. 333,602, Feb. 20, 1973, abandoned.

[52] U.S. Cl. ................... 350/160 LC; 350/96 C
[51] Int. Cl.² .......................... G02F 1/13
[58] Field of Search .......... 350/96 WG, 96 C, 90, 350/160 LC

[56] References Cited
UNITED STATES PATENTS

| | | | |
|---|---|---|---|
| 3,624,336 | 7/1972 | Kogelnik | 350/96 WG |
| 3,753,157 | 8/1973 | Ash et al. | 350/96 WG |
| 3,791,716 | 2/1974 | Borel et al. | 350/160 LC |

OTHER PUBLICATIONS

Bush et al. "Liquid Crystal Display Device", *IBM Tech. Dicls. Bull.* vol. 14, No. 1, p. 223, June 1971.

*Primary Examiner*—John K. Corbin
*Assistant Examiner*—Matthew W. Koren
*Attorney, Agent, or Firm*—R. S. Sciascia; Philip Schneider; Melvin L. Crane

[57] ABSTRACT

This disclosure is directed to an electrical means for input and output coupling of light in optical waveguides.

4 Claims, 2 Drawing Figures

LIQUID CRYSTAL SWITCH FOR OPTICAL WAVEGUIDE

CROSS REFERENCE TO RELATED CASE

This application is a continuation-in-part of application Ser. No. 333,602 filed Feb. 20, 1973 now abandoned.

BACKGROUND OF THE INVENTION

This invention relates to optical waveguides and more particularly to a control of input and output of light in a waveguide system, and/or to the modification of propagation characteristics of optically guided light.

The propagation of light in optical waveguides is of current interest because these systems can perform many data-processing and communication functions. Integrated optical technology may be envisioned to combine a system that is capable of modulating, switching, and detecting with optical microcircuitry. A microoptical system is desirable since it is rigid, free from environmental effects, and capable of handling greater volumes of information than traditional electronic systems.

Optical waveguides are well known in the art and it is well known in the art to use coherent light with such waveguides. An optical waveguide consists of a region in which the index of refraction is greater than the index of refraction of the surrounding medium, top and bottom. Such has been set forth in an article "Light Waves in Thin Films and Integrated Optics", P. K. Tien, Applied Optics, 10, pages 2395, 1971. The methods for fabricating substrates of given fixed indices of refraction for any given index between 1.3 and 3.0 are well known. Coherent light propagating along the waveguide region will suffer total internal reflection at the boundries between the waveguide region and the surrounding medium. If the angle of incidence $\Theta$ is greater than the critical angle $\Theta_c$, that is, $\Theta > \Theta_c = \text{Sin}^{-1} (N_{0,2}/N_1)$ where the index of refraction of the upper layer is $N_0$, the waveguide region $N_1$ and the lower layer $N_2$. The coherent light traveling in the waveguide is trapped in the waveguide region by being totally reflected from the upper and lower interfaces between the waveguide region and the upper and lower medium. The nature of the coherent light trapped in the waveguide is subject to the boundry conditions, i.e., index of refraction of the substrate, index of refraction of the media and angle of insertion of the light. Depending on the difference in the indices of refraction (media) and substrates, different discrete angles of insertion can be allowed, since the solution of the boundry condition problem provides for only Eigen valued solutions. Thus, only a discrete number of modes can be supported in the waveguide. The greater the difference in the index of refraction between the media and the substrate, the larger the number of discrete modes that can be supported.

Now considering those properties of waveguides which lead to low-loss propagation, to techniques of input and output couplings, and to optical switching and modulation, there is considerable discussion in the literature concerning various topological shapes of optical waveguides and their characteristics. Waveguides may be flat slabs, rectangular, cylindrical, or any other shape. Metal-clad dielectrics may not be used in optical waveguides due to the high losses. When light is reflected off a metal surface, the energy losses depend on the metal, the wavelength of the light, surface condition, polarization, and angle of incidence, and losses are typically about 1 or 2% per reflection. Hence, metal-clad waveguides, because of the number of reflections per centimeter, are extremely lossy in the optical region. In the dielectric-clad waveguide, losses are due to absorption in the dielectrics and scattering losses. If the cladding has no absorption at the optical wavelength being propagated, then no energy is absorbed from the evanescent wave (extending into the cladding) and the waveguide suffers only from scattering losses.

To couple coherent light into and out of a waveguide, it is necessary to change the boundary conditions. This may be done in several ways, by use of a prism, an optical grating, or tapered edge. In the prism coupler, a prism is brought within a few optical wavelengths of a waveguide surface and frustrates total internal reflection at the surface. Frustrated total internal reflection or evanescent-field coupling, occurs because the boundary conditions of a waveguide are modified by the presence of the prism. A second type of coupler, the grating coupler, comprises a periodic structure in contact with the waveguide boundary. This structure permits momentum matching between a guided optical wave and a wave propagating in the cladding medium and thus provides coupling between the two waves. Another coupler includes a tapered edge or edge fired coupler.

To construct active devices, the index of the waveguide media, or the determining boundary conditions, must be actively controlled by some external parameter. Once this is achieved, the construction of systems that will act as modulators, deflectors, and switches is possible.

This invention makes use of a viscous fluid such as liquid crystals either cholesteric, smectic or nematic. Liquid crystals are substances which upon being melted instead of becoming a clear liquid, they pass through a turbid fluid state which is termed the mesomorphic or liquid crystal state. Liquid crystals useful in this case are well known in prior art and have been set forth in U.S. Pat. No. 3,322,485, for example. Also the following liquid crystals are useful: Nematic —4' Cyano 4' Pentyl Biphenyl; Smectic 4 Cyano 4' Octyl biphenyl; Cholesteric; Cholesteryl, Nononoate, Deconoate, Chloride. Liquid crystal properties have been set forth in "Prospectus for the Development of Liquid Crystal Waveguides", NRL Report 7507, by Joel M. Schnur and Thomas G. Giallorenzi, published by Naval Research Laboratory, Washington, D.C. 20375.

SUMMARY OF THE INVENTION

This invention combines liquid crystals with an optical waveguide in order to couple coherent light out of and into the waveguide. The liquid crystal is one of the substances adjacent the waveguide and normally has an index of refraction less than that of the waveguide section. The liquid crystal must be highly aligned to insure guiding. The nature of the alignment i.e., homotropic or homogeneous will affect the index of refraction presented to the incoming coherent light and thus determine whether wave guiding is possible and the number of modes that can be supported. Since the indices of refraction of these liquid crystal materials is never less than 1.3 nor greater than 3.0, the liquid crystal materials must be either positive dielectric or the applied field must be such that dynamic scattering will not occur. If there is dynamic scattering the guiding will be completely destroyed. This effect can be used as an on-off switch but not as a mode selector, since no modes can be supported in the dynamically scattering liquid crystal media. It will always be possible to fabricate a substrate which in combination with a given liquid crystal will support waveguiding. Thus, either homotropic or homogeneous alignment is acceptable.

It is important that the optically transparent metal electrodes be sufficiently thin for example 100 Angstroms so as not to disturb the boundary conditions previously described. An electric field is produced between the optically transparent electrodes on opposite surfaces of the positive dielectric liquid crystal such as 4′ Cyano 4′ Pentyl Biphenyl, 4′ Butyl 4 Butyl Azoxy Benzene or any other similar material (for many materials the magnitude and/or sense of the dielectric constant is a function of frequency of the applied field). The applied electric field changes the index of refraction of the liquid crystal to approximately that of the waveguide, therefore, light may be coupled into or out of the waveguide through the area of the liquid crystal in which the index of refraction has been changed.

Since the electric field will perturb the alignment of the liquid crystal the index of refraction presented to the incoming beam will be changed. Thus the boundary conditions are changed. Thus it is possible to select various modes that will be supported in the guide or adjust the field to make guiding possible. Most nematic liquid crystals exhibit changes of index of refraction in excess of 0.15 upon application of suitable fields thus all of the above effects are easily demonstrated. This is analogous to the prism coupler which requires a coherent light source. If a periodic structure is formed in the liquid crystal, then light will be coupled out in a manner similar to that of a grating coupler. The cholestric phase of liquid crystals has this periodic structure and may be used in a manner similar to the grating, however, in this case, the application of an external field will change the periodicity of the cholesteric and will lead to an electronically tunable output coupling grating. A nematic negative dielectric material such as Methyoxy Butyl Aniline (MBBA) or any other similar material will provide a variable efficiency output grating coupler if one aligns this nematic material by means of a periodic electrode configuration. The periodic applied field aligns the nematic material molecules and the strength of the applied field will determine the depth of index modulation in the nematic material.

STATEMENT OF THE OBJECTS

It is therefore an object of the present invention to provide an optical waveguide with an electronically controllable boundary layer.

Another object is to provide a simple, efficient optical waveguide coupling for coherent sources.

Yet another object is to provide an electronically controllable optical coupling for a waveguide.

Still another object is to provide an optical waveguide coupler in which the time period may be controlled and which can be used to select modes.

Other objects and advantages of this invention will become obvious from a reading of the following specification when considered with the drawings.

DESCRIPTION OF THE DEVICE

Figure 1:
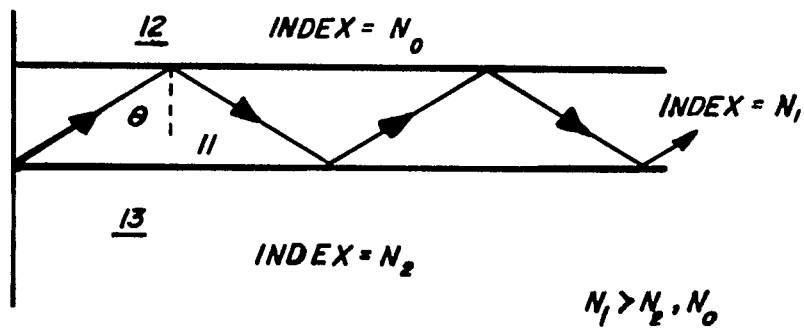
FIG. 1 illustrates a prior art optical waveguide.

Referring to FIG. 1, there is shown by illustration a well known optical waveguide made in accordance with the teaching of the prior art. As shown, the optical waveguide of FIG. 1 includes an optical waveguide region 11 made of a high-index dielectric layer formed between two lower index mediums 12 and 13. The waveguide region has a higher index of refraction $N_1$, than that of the lower index mediums ($N_0$, $N_2$) which confines light therein by multiple total internal reflections as shown by the arrows.

Figure 2:
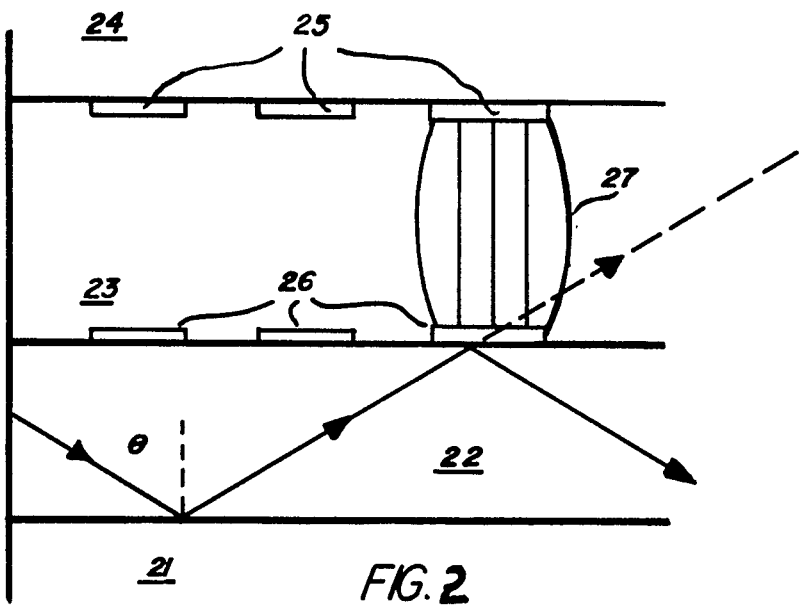
FIG. 2 illustrates a perspective view of an optical waveguide in combination with a liquid crystal shown with an electrically controlled light coupler.

FIG. 2 illustrates an optical waveguide made in accordance with the teaching of the present invention. As shown, the optical waveguide includes a substrate 21 such as glass having an index of refraction from 1.3 to 3, $N_2$, upon which rests the optical waveguide section 22 formed by a high-index dielectric layer of material having an index of refraction, $N_1$ which is greater than, $N_2$. Above the waveguide section 22, a viscous fluid mesomorphic material 23 such as 4′ Cyano 4′ Pentyl Biphenyl is placed. The liquid crystal is suitable aligned, e.g., by a prior art method of J. L. Janning as disclosed in *Applied Phys. Letters*, 21 page 173, 1972; or by D. W. Berreman, *Physical Review Letters*, 28 page 1683, 1972. The liquid crystal has an index of refraction from 1.5 to 2.0, $N_0$, is sensitive to an electric field, and is confined between a glass plate 24 having an index of refraction, $N_2$, and the waveguide section 22. One or more pairs of oppositely disposed optically transparent electrodes 25,26 are formed respectively on the glass plate and on the upper surface of the optical waveguide section with each pair of electrodes having the same configuration. The electrodes have a thickness of about 100 Angstroms which does not affect the boundary conditions and may be linear, triangular or any other desired shape. In the absence of an applied field, the index of refraction, $N_0$, of the liquid crystal is less than that of the index of refraction, $N_1$, of the optical waveguide dielectric layer, therefore, $N_1 > N_0, N_2$. When an electrical current is applied to the electrode pairs, singly or multiply causing an electric field 27 between the electrodes, the index of refraction of the liquid crystal in the area between the electrodes changes to approximate that of the optical waveguide layer, therefore $N_1 \approx N_0$. $N_0$ is the index of refraction of the liquid crystal in the electric field.

When the index of refraction of the liquid crystal and the substrate are less than that of the optical waveguide layer, coherent light propagating along the waveguide region at discrete modal angles will suffer total internal reflection at the boundaries provided the angle of incidence $\Theta$ is greater than the critical angle $\Theta_c$, $\Theta_c = \mathrm{Sin}^{-1}(N_{0,2}/N_1)$. The light will be trapped within the waveguide region and will therefore be guided within the waveguide region. If an appropriate voltage such as 300 Hz, 100 volts, is applied to an electrode pair, the index of refraction of the liquid crystal in the area between the electrodes will change to be substantially equal to that of the waveguide region. In this condition, light may be coupled out of or into the waveguide region. This is true because the boundary conditions in the area of the electrode pair to which an electrical current has been applied is changed such that total reflection will no longer be possible at the area covered by the bottom electrode. In this condition, light may be coupled out of or into the waveguide through the liquid crystal area bounded by the electrodes to which a voltage has been applied to create an electric field. Therefore, the transparent electrodes may be used as a switch to control the light path of light within an optical waveguide.

Since the light propagating in a waveguide is confined to certain discrete propagation angles which are characteristic of a given mode, electronically tuning the index of the liquid crystal boundaries will result in a selective filtering of the discrete modes. A mode will only be coupled out of the guide when the liquid crystal index exceeds the effective modal index as defined, for example, by "Light Waves In Thin Films and Integrated Optics", by P. K. Tien, *Applied Optics* 10, 2395, 1971. Therefore, selective coupling or filtering of the waveguide modes is possible when liquid crystals form the waveguide boundary.

In some liquid crystal substances, transparent electrodes have short life-time; therefore, the electrodes may be coated with a transparent coating of a glassy material not affected by the liquid crystal substance. Thus, the electrodes may be protected and operative for long life time use. This also decreases any perturbation the electrodes have on the waveguide.

If the electrodes are made periodic in a direction along light propagation, and an electric field is applied then a periodic index variation may be set up in the liquid crystal (nematic) e.g. MBBA. This periodic index variation will tend to couple light out of the waveguide in the well known fashion of the grating coupler such as disclosed in U.S. Pat. No. 3,674,336. However, the present invention will lead to a grating coupler that is electronically variable in coupling efficiency.

Another variation of the grating coupler is obtained if a cholesteric material such as a compensated mixture of cholesteryl chloride and chloesteryl nyristate is used between the electrodes (25 and 26). The electrodes in this case do not have to have a periodic structure, they may be continuous. The cholesteric in this case has the periodic structure built into it and the application of an electric field will lead to a variation in the periodicity of the liquid crystal. The cholesteric will have to have its helix axis aligned parallel to the waveguide plane for maximum interaction. This will lead to a frequency tunable grating output coupler for fixed output coupled angle.

If the applied voltage, is high enough, and the appropriate frequency is used, dynamic scattering will occur in negative dielectric liquid crystals. This mode will cause losses in the evanescent wave, therefore, switching off the coherent optical waveguide.

The teaching in this disclosure may be carried out further by incorporating principles well known in the prior art to provide memory in the switch such as in U.S. Pat. No. 3,592,527. Therefore, the waveguide may be switched for long periods as well as for short periods.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A coupler for coupling coherent radiation out of or into a waveguide capable of supporting a discrete number of propagating radiation modes which includes a high index of refraction dielectric layer between first and second mediums, said first and second mediums normally having an index of refraction less than that of said high-index of refraction dielectric layer, wherein:

said first medium is a liquid crystal in its mesomorphic state of lowest index of refraction;

said second medium is a substrate of constant index of refraction;

means for confining said liquid crystal in homogeneous alignment in contact with said high-index of refraction dielectric layer;

at least one pair of first and second oppositely disposed radiation transparent electrodes of like configuration secured with said liquid crystal medium therebetween;

said first electrode of each pair secured onto said means for confining said liquid crystal medium in contact with said high-index of refraction dielectric layer; and said second electrode of each pair secured onto said high-index of refraction dielectric layer;

whereby an electrical voltage applied to at least one pair of said radiation transparent electrodes increases the index of refraction of said liquid crystal confined between said electrodes to which a voltage is applied to approximately that of the index of refraction of said high-index of refraction dielectric layer to couple light out of or into said high-index of refraction dielectric layer through said second electrode and the area confined by said electrode pair to which a voltage has been applied.

2. A coupler as claimed in claim 1; wherein, said liquid crystal is a positive dielectric liquid crystal.

3. A coupler as claimed in claim 2; in which, said electrical voltage applied onto said electrodes is 300 Hz, 100 volts.

4. A coupler as claimed in claim 1, wherein: said liquid crystal is nematic.

* * * * *